United States Patent [19]

Hedgepeth et al.

[11] Patent Number: 4,569,176
[45] Date of Patent: Feb. 11, 1986

[54] RIGID DIAGONAL DEPLOYABLE LATTICE COLUMN

[75] Inventors: John M. Hedgepeth, Santa Barbara; Louis R. Adams, Ojai, both of Calif.

[73] Assignee: Astro Research Corporation, Carpinteria, Calif.

[21] Appl. No.: 555,702

[22] Filed: Nov. 28, 1983

[51] Int. Cl.[4] .................................. E04H 12/18
[52] U.S. Cl. ............................ 52/645; 52/111; 182/152; 244/159; 403/171
[58] Field of Search ............... 403/64, 102, 170, 171, 403/172, 176; 244/158 R, 159, 173; 343/880, 881, 882, 915, DIG. 2; 52/108, 109, 111, 117, 121, 632, 638, 641, 645, 646, 648, 651, 652; 182/152

[56] References Cited

U.S. PATENT DOCUMENTS

| | | | |
|---|---|---|---|
| 415,667 | 11/1889 | Edwards | 52/109 |
| 2,301,077 | 11/1942 | Payton | 403/102 |
| 3,486,279 | 12/1969 | Wess | 52/108 |
| 3,521,421 | 7/1970 | Schroeder, Jr. | 52/648 |
| 3,757,476 | 9/1973 | Schoen | 52/646 |
| 3,830,031 | 8/1974 | Soisson | 52/109 |
| 4,115,975 | 9/1978 | Bliss | 52/646 |
| 4,332,501 | 6/1982 | Slysh | 52/108 |
| 4,334,391 | 6/1982 | Hedgepeth et al. | 52/108 |
| 4,480,415 | 11/1984 | Truss | 244/159 |
| 4,482,900 | 11/1984 | Bilek et al. | 343/915 |

FOREIGN PATENT DOCUMENTS 2487133 1/1982 France ........................ 244/159

OTHER PUBLICATIONS

Popular Mechanix, Radio Towers Crank Up To The Sky, Jan. 1956, pp. 148, 149.

*Primary Examiner*—John E. Murtagh
*Assistant Examiner*—Andrew Joseph Rudy
*Attorney, Agent, or Firm*—Spensley Horn Jubas & Lubitz

[57] ABSTRACT

The disclosed deployable lattice column includes a plurality of longeron elements connected together and reinforced by lateral elements including both diagonal members and battens. The diagonal members are formed of rigid elements thereby maintaining the stiffness of the lattice column when deployed, even when torsional loads are applied to the column.

9 Claims, 7 Drawing Figures

RIGID DIAGONAL DEPLOYABLE LATTICE COLUMN

BACKGROUND OF THE INVENTION

1. Field of the Invention

The invention relates to a deployable lattice column incorporating rigid diagonal members, which members significantly increase the torsional stiffness of the deployed column when compared to the torsional stiffness of such a column with flexible diagonal members.

2. Prior Art

Deployable lattice columns are used in a variety of environments, including both space and terrestrial applications. In many of these environments, the deployed column will be subjected to physical forces challenging its integrity. For example, the column may be used to elevate and support a dish antenna. Weather forces acting on the antenna can and will impart severe strain to the column.

In a deployable lattice column such as described in U.S. Pat. No. 3,486,279 or U.S. Pat. No. 4,334,391, flexible diagonal members are employed to stiffen the column. In some designs, such flexible members each include a latching mechanism that allows a change in diagonal length during packaging. Such flexible members significantly contribute to the ability of such a lattice column to be deployed from a collapsed state; in fact, some people have even considered such columns to require the use of flexible diagonal members. However, when a torsional load is imparted to such a column, for example by wind forces buffeting a supported dish antenna, the resulting twisting of the column can cause various of the diagonal members to slacken, thereby significantly degrading the stiffness of the column and, in response to severe forces, contributing to failure of the column. Also, flexible diagonal members with latching mechanisms complicate and slow both deployment and retraction of the column.

It is an object of this invention to provide a deployable lattice column of significantly increased torsional strength when compared to deployable lattice columns of the prior art. It is also an object of this invention to provide a deployable lattice column with rigid diagonal members of a fixed length. It is another object of this invention to achieve such a column without substantially increasing its overall size or its collapsed volume. These and other objects will appear from the following description of a preferred embodiment.

BRIEF SUMMARY OF THE INVENTION

The deployable lattice column of the invention is movable between a collapsed and a deployed state, bay by bay, each bay including a plurality of rigid longeron elements and a plurality of rigid batten members. Corner fittings are provided which interconnect the ends of the batten members with the longeron elements such that the longerons and battens are movable between a collapsed state in which the battens and longerons of each bay all lie generally in the same plane, and a deployed state in which the longerons are generally perpendicular to the battens. The column also includes a plurality of rigid diagonal members, and hinge means connecting the diagonal members to the corner fittings such that when the column is in a collapsed state, the diagonal members of each bay also lie generally in the same plane with the battens and longerons of the bay, and when the longerons and battens are in a deployed state, the rigid diagonal members are connected to two diagonally opposed corner fittings of the bay.

Preferably the longerons are hinged to each corner fitting, and the battens define a triangular shape. Also, preferably the diagonal members are hinged generally midway between their ends, and at their ends, to fold when the lattice column is being collapsed, the diagonal members end hinges preferably being in the main longitudinal axis of the diagonal. Also, preferably the hinges of the batten and longerons lie in the main longitudinal axis of the battens and longerons. In addition, it is preferred that the hinges have only one degree of freedom, and that the midhinge of the diagonal member lie in the side face plane of the column when deployed and, when the column is collapsed, is angled at least 40 degrees away from the beam axis.

BRIEF DESCRIPTION OF THE DRAWINGS

The invention will be further described in connection with the accomanying drawings, in which.

DETAILED DESCRIPTION

Previous deployable lattice columns of the type or style herein addressed have included flexible diagonal members. Of course, there have been other types of columns, one type being generally similar to a lazy tong configuration (see for example U.S. Pat. No. 415,667), but for many applications such lazy tong designs are not desirable.

In designing deployable lattice columns, significant problems are presented. Each bay of such a column must be able to pass between a collapsed and a deployed state. As that happens, the diagonally opposed corners of the bay change their orientation and distance from one another. The diagonal members which span such opposed corners must be able to accommodate such changes.

Previous designs of deployable, or collapsable, lattice columns have all employed flexible diagonal elements to adapt to such changes in the configuration of the parallelogram of the column which they span as the parallelogram changes and distorts from the column's collapsed condition to the column's deployed or erected condition. Since these diagonal elements must be under strain when the column is deployed, some designs, such as shown in U.S. Pat. No. 3,486,279, have incorporated springs which, when the column is deployed, are under tension and impart tension to the diagonal elements. Other designs, such as shown in U.S. Pat. No. 4,334,391, incorporate continuous longerons and unitary, flexible diagonal elements of a length such that, when the column is deployed, they are under the desired tension. Examples of the various shapes assumed by the parallelogram during deployment of the lattice column are shown in U.S. Pat. No. 3,486,279, particularly in FIGS. 5, 5A, 6 and 6A.

The advantages which could be attained in such a deployable lattice column were it possible to use a rigid diagonal element are significant. In particular, when torsion is applied to a column incorporating flexible diagonal elements, such as diagonal elements of wire or cable, the torsion may be sufficient to release the strain on one or more of the diagonal elements. This in turn significantly degrades the stiffness of the column in that area and can (and has) led to failure of the column. A column with rigid diagonal elements would not be subject to such a tendency. Likely for this reason, lattice columns which have not been designed to be collapsed and erected, but rather which have been constructed or assembled in their final, elongated shape, have most often employed rigid diagonal elements. But because of the significant distortion of the parallelogram spanned by such diagonal elements in a deployable lattice column, it apparently has not been thought possible, in the past, to achieve a deployable lattice column with rigid diagonal elements. The present inventors have challenged that assumption, and problem, and found that such a column can be achieved.

Figure 1:
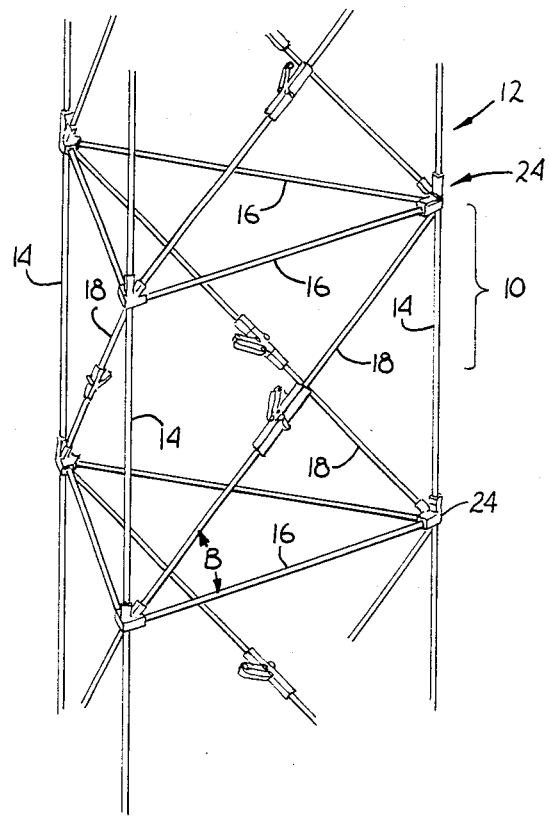
FIG. 1 is a perspective view of a portion of a deployed column constructed in accordance with the invention.

An example of such a column, employing rigid diagonal elements, is generally illustrated in its erected state in FIG. 1, this figure showing one bay 10 of the column 12, as well as portions of the bay above and beneath bay 10. The bay generally is defined by longeron elements 14, batten elements 16, and includes diagonal members 18 extending between opposed corners of the parallelograms formed by longerons 14 and battens 16. Preferably the diagonal members for one bay are arranged such that the three diagonal members are connected to the six corners of the bay. (Typically a deployable lattice column will be generally triangular in cross-sectional configuration, and the column illustrated in FIG. 1 is of such a shape. However, columns of other cross-sectional configurations could be designed, if desired, employing the principles herein set forth.) Each diagonal member includes, generally midway along its length, a hinged element 22. The diagonals, longerons and batten members or fittings are connected at their ends to corner members 24 which, as will be subsequently shown, are of one of two different designs designated 24 and 24', the designs alternating along the longerons.

Figure 2:
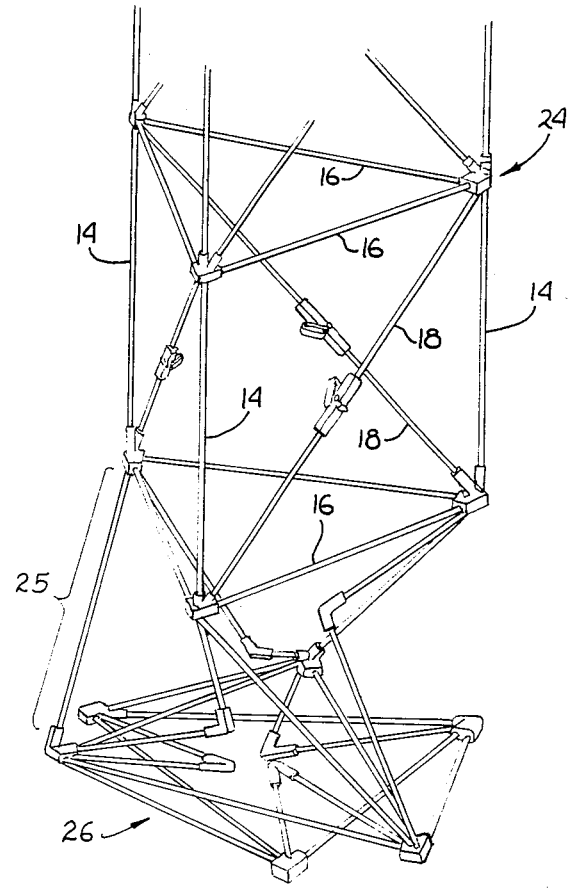
FIG. 2 is a perspective view of a portion of the preferred column showing one of the bays in a collapsed state, the next bay in a partially collapsed state, and the upper bay of the series in a deployed state.

A deployable lattice column with rigid diagonal members, in the process of being collapsed, is illustrated in FIG. 2. It includes a fully deployed bay 10, a bay 25 in the process of collapsing, and a bay 26 that is fully collapsed. Generally speaking, as a bay collapses, the rigid diagonal elements fold and collapse inwardly while the upper triangle formed by the three upper battens 16 of the bay rotates relative to the triangle formed by the three lower battens of the bay, the interconnecting longeron elements 14 folding and hinging on the corner fittings as the batton triangles rotate relative to one another. This will be apparent from a careful inspection, for example, of FIG. 2. Such movement of the bay's component is made possible by the unique design and interrelationship of the various elements employed in the lattice column.

Figure 3:
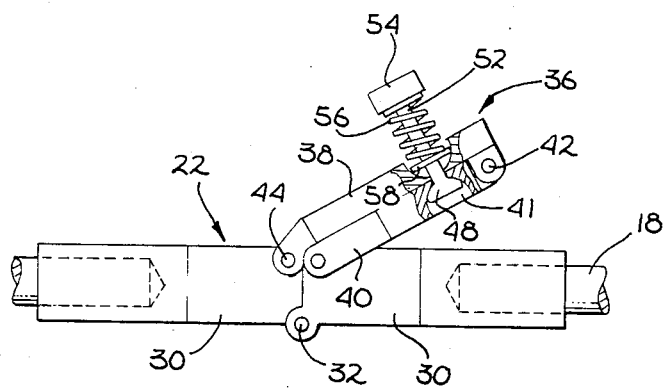
FIG. 3 is an elevational view of the mid-hinge of a diagonal member, showing the diagonal member in a deployed state.
Figure 4:
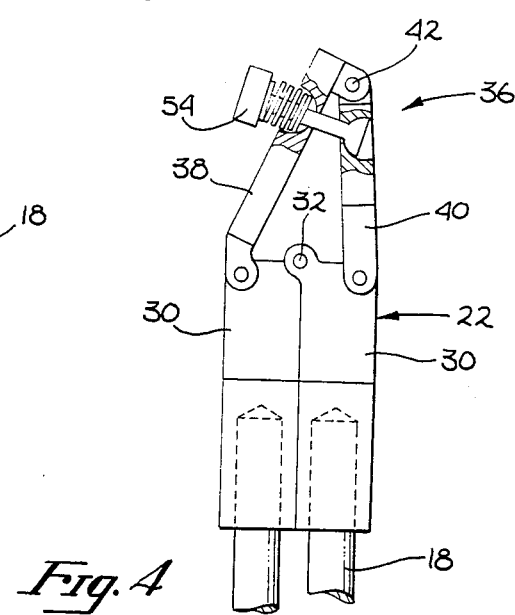
FIG. 4 is an elevational view of the hinge shown in FIG. 3, the diagonal member being in a folded or collapsed state.

One of those elements, the hinge element 22 included in each diagonal member 18, is illustrated in FIG. 3 in an opened, or longitudinally aligned, relationship, and in FIG. 4 in a closed or folded relationship. It incorporates two blocks 30 hinged along one side edge by hinge pin 32 received in appropriate openings formed in each block, generally as shown. These blocks are rigidly attached to diagonal members 18 in any convenient fashion, such as by an appropriate adhesive.

The hinge pin 32, which is the folding or pivot point of hinge element 22 preferably is offset from the major longitudinal axis of the diagonal numbers 18. When the diagonal members are deployed, preferably pivot or hinge pin 32 lies in the plane formed by the longeron and battens defining the parallelogram spanned by the diagonal member. It is preferred that the hinge elements incorporate a mechanism that tends to hold, and lock, it in an opened position such as shown in FIG. 3. This holding mechanism 36 consists of two legs 38 and 40, the legs being attached to one another by hinge pin 42, each leg being attached to one of the end members 30 of the hinge element by a pin 44 located at the inner end of each end block generally in an opposed relationship to one another as shown. The legs 38 and 40 include openings 46, one of which received the spherical head 48 of a shaft 52 that is threaded at its opposite end to receive a nut 54. A compression spring 56 is received about that shaft between nut 54 and washer 58 located in the recess in leg 38. Thus, spring 56 tends to hold the legs together in the position shown in FIG. 3, and to oppose opening of the hinge element to the position shown in FIG. 4, thereby tending to lock the diagonal members in an opened, or aligned, relationship.

Figure 5:
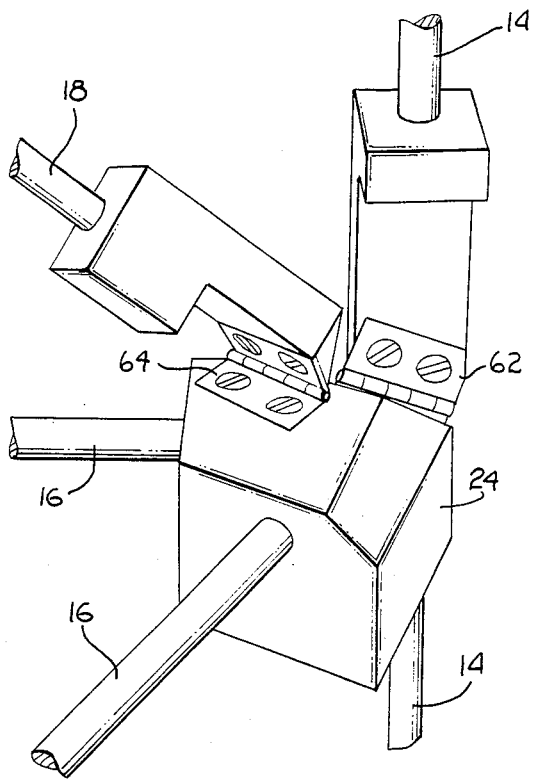
FIG. 5 is a perspective view of a first corner fitting.
Figure 6:
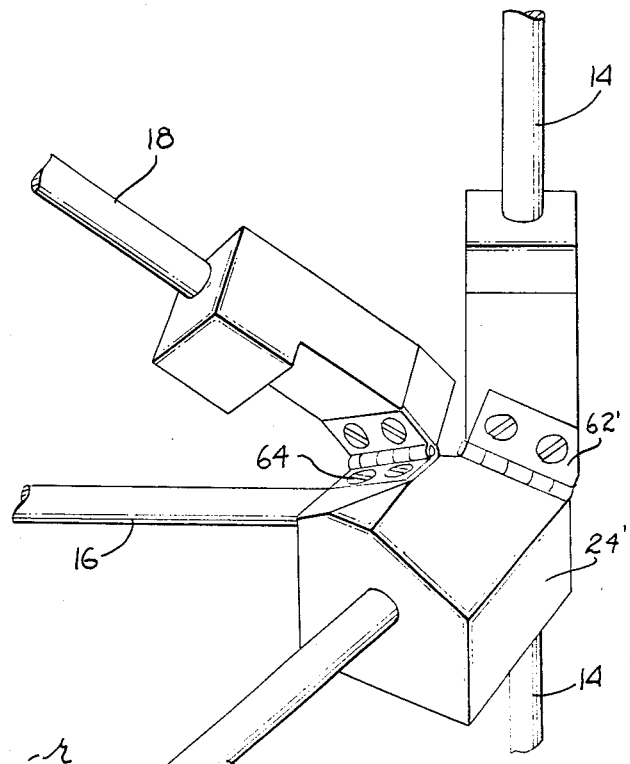
FIG. 6 is a perspective view of a second corner fitting.

To achieve a functional lattice column that may be deployed and that includes rigid diagonal members, it is necessary in some cases, and preferred in other cases, to employ elements and relationships as illustrated in the drawings of this specification. For example, it is preferred to use hinges which have a single degree of freedom, such as simple piano hinges. The resulting kinematics are more predicatable, and the deployment of the column is more reliable. Also, in order that relative movements of the members do not cause local bending at the joints, all hinges should pass through deployed member center lines. In order that the collapsed, or packaged, diagonal members do not interfere with each other, the midlength hinge element is offset from the geometric center of the deployed diagonal member by an amount sufficient to cause these diagonal members, when folded and the column is in a collapsed condition, to clear each other (such a relationship is well illustrated in FIG. 7 of the drawings). Generally because of this required offset relationship, the hinges at either end of the diagonal members will be different, and the corner fittings thus also will be different. The first corner fitting 24 is illustrated in FIG. 5; the second corner fitting 24' is illustrated in FIG. 6. These figures also illustrate the end pieces for diagonal member 18 and for longeron 14. Of course, the critical relationship between these elements is generally the location and angular orientation of the various hinge means 62 and 64 or 62' and 64', respectively, that connect them. Also, these elements must be shaped to clear one another as their bay passes between a collapsed and a deployed state, and they must be of a material and design that gives them strength sufficient to withstand the stresses anticipated to be applied to the column.

For ease of reference, hinge means 64 and 64' are referred to herein as the first hinge means. As illustrated in FIGS. 5 and 6, hinge means 64 and 64' join the corner elements 24 and 24' respectively to various diagonal members 18, as well as to the longeron elements 14 and batten elements 16. Hinged element 22 is referred to as the second hinge means, and as noted above, is disposed along the length of the diagonal members 18.

Figure 7:
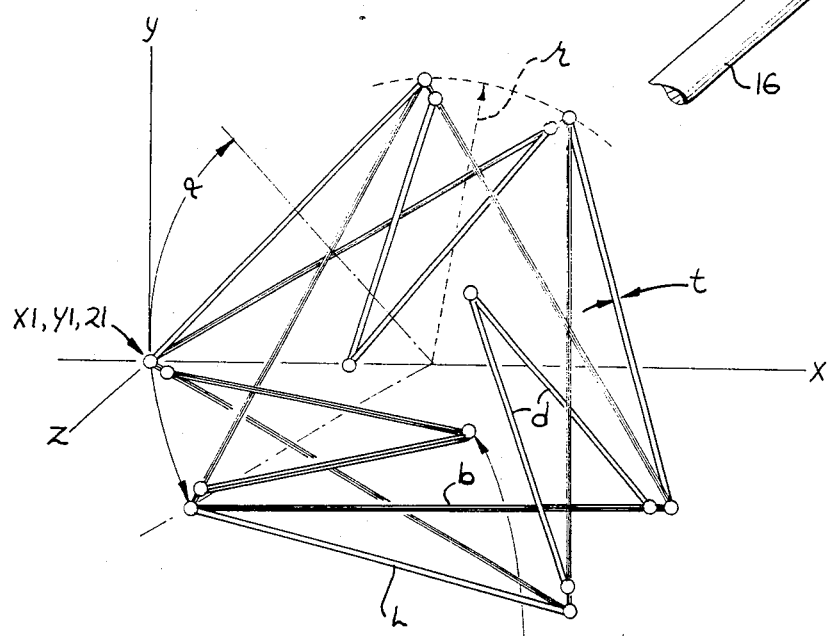
FIG. 7 is a diagrammatic view illustrating certain relationships of the various members of the column.

To determine, and then to describe, the preferred location of each of these elements or members, it is convenient to employ conventions of solid geometry. The conventions here employed are illustrated in FIG. 7. The x and y axes are as there shown, while the z axis is perpendicular to the plane of the illustration. Also, it is necessary to define the vector for each hinge with reference to its orientation relative to the x axis (the i displacement), the y axis (the j displacement), and the z axis (the k displacement). In addition, as the batten triangles rotate while the bay moves between its collapsed and erected state, the corner members will circumscribe or define elements of a circle of a radius r.

Using the foregoing conventions, a deployable lattice column with rigid diagonal members may be constructed with members defined and interrelated as follows:

Radius, $r = 20.00$ in.
Baylength, $L = 30.00$ in.
Member diameter, $t = 1.00$ in.
Batten length, $b = 34.64$ in.
Diagonal length, $d = 45.83$ in.
Diagonal-batten angle, $B = 40.89$ degrees
Packaging angle, $x = 46.47$ degrees Indexing angle, $X1 = 27.06$ degrees
Longeron hinge position,
  $xL = 0.000$ in.
  $yL = 0.000$ in.
  $zL = 0.500$ in.
Longeron hinge vector, $HL = 0.725i - 0.311j + 0.311k$
Diagonal packaged End 1 hinge position,
  $x1 = 0.500$ in.
  $y1 = -0.289$ in.
  $z1 = 0.500$ in.
Diagonal packaged End 2 hinge position,
  $x2 = 2.504$ in.
  $y2 = -8.615$ in.
  $z2 = 0.500$ in.
Diagonal packaged midhinge position,
  $xm = 23.236$ in.
  $ym = -5.604$ in.
  $zm = 0.500$ in.
Diagonal Segment 1 length, $d1 = 23.349$ in.
Diagonal Segment 2 length, $d2 = 20.949$ in.
Diagonal End 1 hinge vector, $H1 = 0.217i - 0.461j$
Diagonal End 2 hinge vector, $H2 = -0.189i + 0.216j + 0.147k$ The foregoing relationships of course can be modified to some extent. Different sized columns can be designed with different bay lengths and member diameters. The orientation of the various hinges also may be altered somewhat depending upon various factors, including particularly the strains to which the members may be subjected during transition between a collapsed and an erected state of the bay. While it is possible to determine and define such relationships by calculations employing the principles of solid geometry, such relationships also may be determined, or adjusted, empirically.

It should be noted that strain is imparted, particularly through the diagonal members, as the column passes between its collapsed and deployed condition and that this transition strain is of a fixed amount. A relative minimum for such strain has been found for the case in which the deployed diagonal midhinge lies in the side face plane, or plane defined by the parallelogram of battens and longerons that is spanned by the diagonal member, when the bay is deployed and in the packaged or collapsed condition leans at least 40 degrees away from the beam axis. For various reasons, it is presently preferred that this lean angle be 43.18 degrees.

The foregoing design offers certain unique and distinctive advantages. The various rigid members, both longerons, battens and diagonal members, are substantially unstrained in both a collapsed and deployed configuration; member materials and diameters are not limited by such strain. Also, since the preferred hinges have a single degree of freedom, deployment uncertainty and back lash are minimized. Deployment of the column may be in a sequential fashion since each bay is independent. Thus, stiffness of the deployed column is not degraded during deployment of subsequent bays. If it is desired for alternate bays to be deployed by rotating the column first in one direction, then in the opposite direction, the diagonal elements of adjacent bays may extend in opposite directions. To permit this of course, the corner fittings would be constructed to accommodate such an orientation of the diagonal members.

A preferred embodiment of the invention has been described. Those skilled in this field will appreciate that the principles set forth herein can be applied to various other structures, particularly deployable lattice columns. Accordingly, the scope of the invention is defined by the following claims.

We claim the right to exclude others from making, using and selling:

1. A lattice column movable between collapsed and deployed states, including:
   a plurality of rigid longeron elements;
   a plurality of rigid batten members;
   corner fittings interconnecting the ends of the batten members with the longeron elements such that the longerons and battens are movable between a collapsed state in which the battens and longerons lie generally in the same plane, and a deployed state in which connected longerons and battens form parallelograms and in which each longeron is generally perpendicular to each plane defined by the battens,
   a plurality of rigid diagonal members, and
   first hinge means connecting the diagonal members to the corner fittings such that when the column is in a collapsed state, the diagonal members also lie generally in the same plane of the batten and longerons, and when the longerons and battens are in a deployed state, the rigid diagonal members connect two corner fittings diagonally opposed across the parallelograms.

2. A deployable lattice column as set forth in claim 1 in which the batten members lying in the same plane define a triangle.

3. A deployable lattice column as set forth in claim 1 in which the longerons are hinged to the corner fittings.

4. A deployable lattice column as set forth in claim 1 further including a second hinge means disposed generally midway between the ends of the diagonal members such that the diagonal members can be folded into and out of an axially aligned relationship.

5. A deployable lattice column as set forth in claim 1 in which, said first hinge means interconnects at least some of the longerons to the corner fittings.

6. A deployable lattice column as set forth in claim 1 in which said hinge means has one degree of freedom.

7. A deployable lattice column as set forth in claim 4 in which the second hinge means of the diagonal member has one degree of freedom and in which the pivotal axis of this second hinge means lies in a plane defined by the batten members and longeron elements defining the parallelogram spanned by the diagonal member when the column is in a deployed state and leans at least 40 degrees away from the major longitudinal axis defined by the diagonal member when the column is in the collapsed state.

8. A deployable lattice as defined in claim 5 wherein at least some of the first hinge means interconnecting the battens and the longerons to the corner fittings lie on a longitudinal axis of said longerons.

9. A lattice column movable between collapsed and depolyed states, including:

a plurality of rigid longeron elements;

a plurality of rigid batten members;

corner fittings interconnecting the ends of the batten members with the longeron elements such that the longerons and battens and longerons lie generally in the same plane, and a deployed state in which connected longerons and battens form parallelograms and in which each longeron is generally perpendicular to each plane defined by the battens;

first hinge means connecting the diagonal members and some of the longerons to the corner fittings such that when the column is in a collapsed state, the diagonal members also lie generally in the same plane of the batten and longerons, and when the longerons and battens are in a deployed state, the rigid diagonal members connect two corner fittings diagonally opposed across the parallelograms; and second hinge means located along the length of the diagonal members, said second hinge means permitting the diagonal members to fold into and out of an axial aligned relationship.

* * * * *